United States Patent [19]

Maucher

[11] 4,310,083
[45] Jan. 12, 1982

[54] DEVICE FOR CONNECTING A DRIVING ELEMENT TO A DRIVEN ELEMENT SO AS TO BE LOCKED AGAINST MUTUAL ROTATION, AND FOR SEPARATING THE SAME

[75] Inventor: Edmund Maucher, Bühl,, Fed. Rep. of Germany

[73] Assignee: LuK Lamellen und Kupplungsbau GmbH, Bühl, Fed. Rep. of Germany

[21] Appl. No.: 86,149

[22] Filed: Oct. 18, 1979

[30] Foreign Application Priority Data

Oct. 21, 1978 [DE] Fed. Rep. of Germany ....... 2845875

[51] Int. Cl.$^3$ ............................................. B60K 41/24
[52] U.S. Cl. .................................. 192/18 R; 192/94; 192/99 S
[58] Field of Search ................ 192/12 R, 17 R, 70.16, 192/70.18, 94, 99 S, 52, 54, 18 R; 56/11.3

[56] References Cited

U.S. PATENT DOCUMENTS 2,008,967  7/1935  Rossmann .......................... 192/94 X
3,841,454 10/1974  Pionte ................................ 192/94 X
4,069,905  1/1978  Gennes ............................. 192/70.18
4,205,509  6/1980  Miyazawa .......................... 56/11.3

Primary Examiner—George H. Krizmanich
Attorney, Agent, or Firm—Herbert L. Lerner; Laurence A. Greenberg

[57] ABSTRACT

Device for connecting a driving element to a driven element so as to be locked against mutual rotation, and for separating the same, including a friction disc having two friction surfaces, the disc being fixed against radial movement and shiftable in axial direction, a device for stopping the axial shift of the disc in direction away from the driving element, the driven element being in the form of axially shiftable friction parts being coaxial and engageable with the friction disc and rotatable relative thereto, each of the friction parts having a counter-friction surface disposed thereon, a connecting device for transmitting torque between the friction parts, the connecting device being elastic in axial direction and stiff in direction of rotation of the friction parts, and a device for disengaging one of the friction parts from the friction disc.

15 Claims, 4 Drawing Figures

DEVICE FOR CONNECTING A DRIVING ELEMENT TO A DRIVEN ELEMENT SO AS TO BE LOCKED AGAINST MUTUAL ROTATION, AND FOR SEPARATING THE SAME

The invention relates to a device for connecting a driving element to a driven element so as to be locked against mutual rotation, such as for locking the output shaft of a motor to an operating device. Such a device may be used, in particular, for a rotating blade of a lawn mower, which is to be fastened to the driven element, and for separating the same.

Such devices, called lawn mower clutches, have become known, for instance, from German Putlished, Non-procecuted Application DEOS No. 2 703 705. Construction and assembly of such a lawn mower clutch is, however, relatively complicated because of the large number of parts that must be used.

It is accordingly an objective of the invention to provide a simple, inexpensive and operationally safe device for connecting a driving element to a driven element so as to be locked against mutual rotation, and for separating the same, which overcomes the hereinafore mentioned disadvantages of the heretofore known device of this general type, and which is especially applicable as a clutch in a lawn mower, having a deadman's handle.

With the foregoing and other objects in view there is provided, in accordance with the invention, a device for connecting a driving element, such as the output shaft of a motor, to a driven element, such as a blade of a lawn mower which is to be fastened to the driven element, so as to be locked against mutual rotation, and for separating the same, comprising a friction disc having two friction surfaces, i.e. facing toward and away from the motor, the disc being fixed against radial movement and shiftable in axial direction, means for stopping the axial shift of the disc in direction away from the driving element, the driven element being in the form of axially shiftable friction parts being coaxial and engagable with the friction disc and rotatable relative thereto, each of the friction parts having a counter-friction surface disposed thereon, connecting means, such as a leaf spring, for transmitting torque between the friction parts, the connecting means being yieldable in axial direction and stiff in direction of rotation of the friction parts, and means for disengaging one of the friction parts from the friction disc.

In accordance with another feature of the invention, the counterfriction surfaces on the friction parts are friction linings disposed on the sides of said friction parts facing the friction surfaces of the friction disc.

In accordance with a further feature of the invention, the friction linings are individual segment-shaped pad sections which can be cemented or riveted on.

In accordance with an added feature of the invention, the connecting means can occupy a position or be built in to comprise means for producing a force component toward the driving element between the friction parts i.e. a self-amplifying locking effect when the driven element is connected to the driving element and positive rotation takes place.

In order to ensure that the blade is stopped safely upon disengaging the clutch, i.e., when the positive rotational connection is severed, in accordance with an additional feature of the invention, there are provided a non-rotatable part and a braking device effective between one of the friction parts and the non-rotatable part. It may be advantageous if the braking device becomes effective between the friction part facing away from the motor side, i.e., the other of the friction parts, and one of the fixed parts of the lawn mower. Therefore, in accordance with yet another feature of the invention, there is provided a brake lining disposed on at least one of said one friction part and said non-rotatable part, and the respective other part can have a braking surface.

In accordance with yet a further feature of the invention, there is provided a non-rotatable part, and the connecting means includes means for transmitting axial motion to the other of the friction parts if the rotational connection is released and contact pressure between the other friction part and the non-rotatable part is produced.

In accordance with yet an added feature of the invention, in the engaged position of the one friction part and friction disc, the brake lining disposed on one of the friction part and non-rotatable part is spaced at a given distance from a braking surface on the other of the one friction part and non-rotatable part, the given distance being less than the axial disengagement travel of the other of the friction parts and the possible wear distance between the lining and the braking or run-up surface.

In accordance with yet an additional feature of the invention, the disengaging means includes an axially movable sleeve extending from one side of one of the friction parts and being engageable therewith from the other side, i.e. from the underneath, of the one friction part.

In accordance with still another feature of the invention, there is provided a motor connected to the driving part, a non-rotatable part firmly connected to the motor and disposed adjacent the sleeve, the sleeve having a screw thread integral therewith for effecting rotation between the sleeve and non-rotatable part, and a flexible cable having a core connected to the sleeve for rotating the sleeve to disengage the one friction part from the friction disc.

In accordance with still a further feature of the invention, there is provided releasable operating means for moving the sleeve in axial direction to disengage the one friction part from the friction disc upon release of the operating means.

In accordance with still an added feature of the invention, the screw thread is a coarse screw thread, and the invention includes ball guide means disposed in the coarse screw thread.

In accordance with a concomitant feature of the invention, the operating means is an operating handle of a lawn mower, said friction disc assumes the function of a flywheel for the motor which is especially useful if the device has no flywheel when the blade is disengaged, and the motor is an internal combustion engine of a lawn mower. The mass of the friction disc is designed so that with the clutch disengaged, the motor can be started without difficulty and runs evenly.

Other features which are considered as characteristic for the invention are set forth in the appended claims.

Although the invention is illustrated and described herein as embodied in device for connecting a driving element to a driven element so as to be locked against mutual rotation, and for separating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 4:
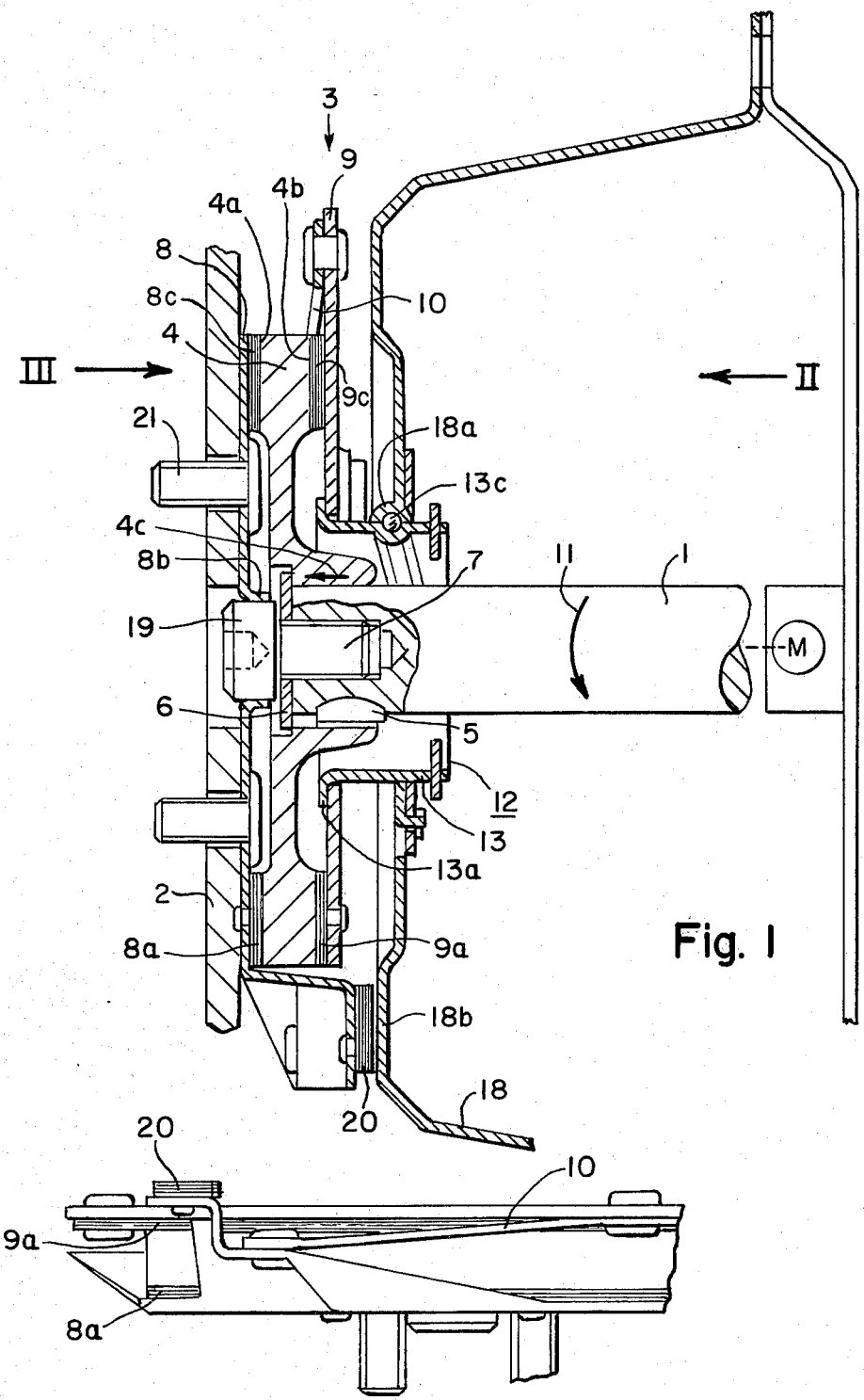
FIG. 1 is a diagrammatic cross-sectional view of the device for connecting the drive of a lawn mower blade so as to be locked against mutual rotation, and for separating same.
FIG. 4 is a detailed view of FIG. 3, taken along the direction of the arrow IV thereof.

Referring now to the figures of the drawing and first, particularly, to FIG. 1 thereof, there is seen a motor output shaft 1 of a motor M for a lawn mower which is the driving element, and a driven lawn mower blade 2. Between these parts, a clutch 3 is provided. The clutch 3 has a friction disc 4 which is equipped with two friction surfaces 4a and 4b, and is securely fastened against mutual rotation, but is axially movably on the motor shaft 1. The rotation-proof connection is accomplished by a key-and-slot connection 5, and a stop 6 in the form of a washer held by a screw 7 which limits the axial mobility of the driving disc 4 in the axial direction 4c.

On both sides of the friction disc 4 and coaxially as well as rotatably mounted relative thereto, friction parts 8,9 are provided. The parts 8,9 have riveted to them friction linings 8c and 9c in the form of segments or pads 8a, 9a.

The one friction part 9 is connected to the other friction part 8 by leaf springs 10. The springs 10 are constructed and arranged in such a manner that they produce a force component of both friction parts 8 and 9 in the direction toward the friction disc 4 disposed therebetween if the clutch is engaged and the rotation is in the direction of the arrow 11.

Figure 2:
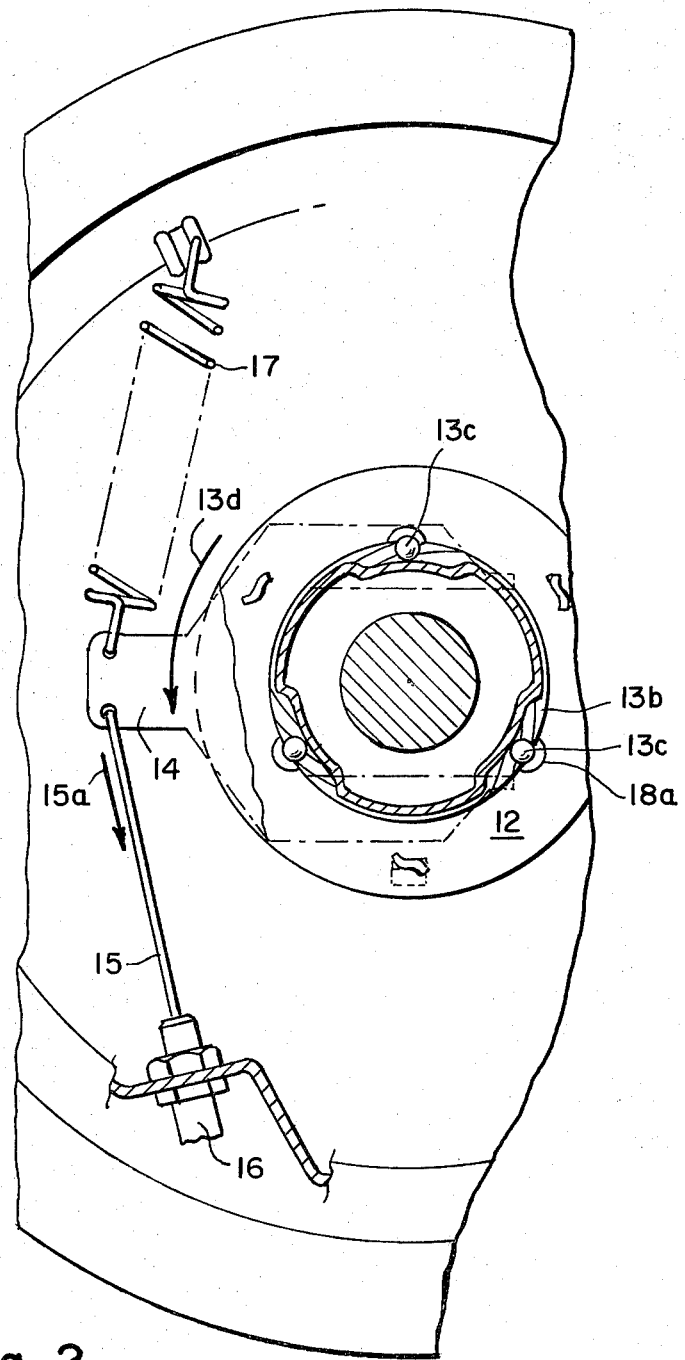
FIG. 2 is a side elevational view, partly in section, of FIG. 1, taken along the direction of the arrow II thereof.

The connecting and separating device includes a disengaging unit 12 which is shown particularly clearly in FIG. 2. The disengaging unit 12 includes a sleeve 13, which engages the one friction part 9 from underneath with a peened-over rim 13a. The disengaging unit furthermore has a lever extension 14, which is engaged, on the one hand, by the core 15 of a flexible cable 16, and on the other hand, by a spring 17. Over part of its range or length, the sleeve 13 has a coarse-pitch thread 13b, into which balls 13c are placed. The counterpart or opposite part of this coarse-pitch thread 13b is provided by a cup-shaped structure 18 of the lawn mower, in the form of recesses 18a. The thread 13b and recesses 18a which guide the balls 13c, force the sleeve 13 to move axially when it is rotated.

A bearing sleeve 19 is placed around the head of the screw 7 in order to center the other friction part 8 through the use of a peened-over rim 8b.

Figure 3:
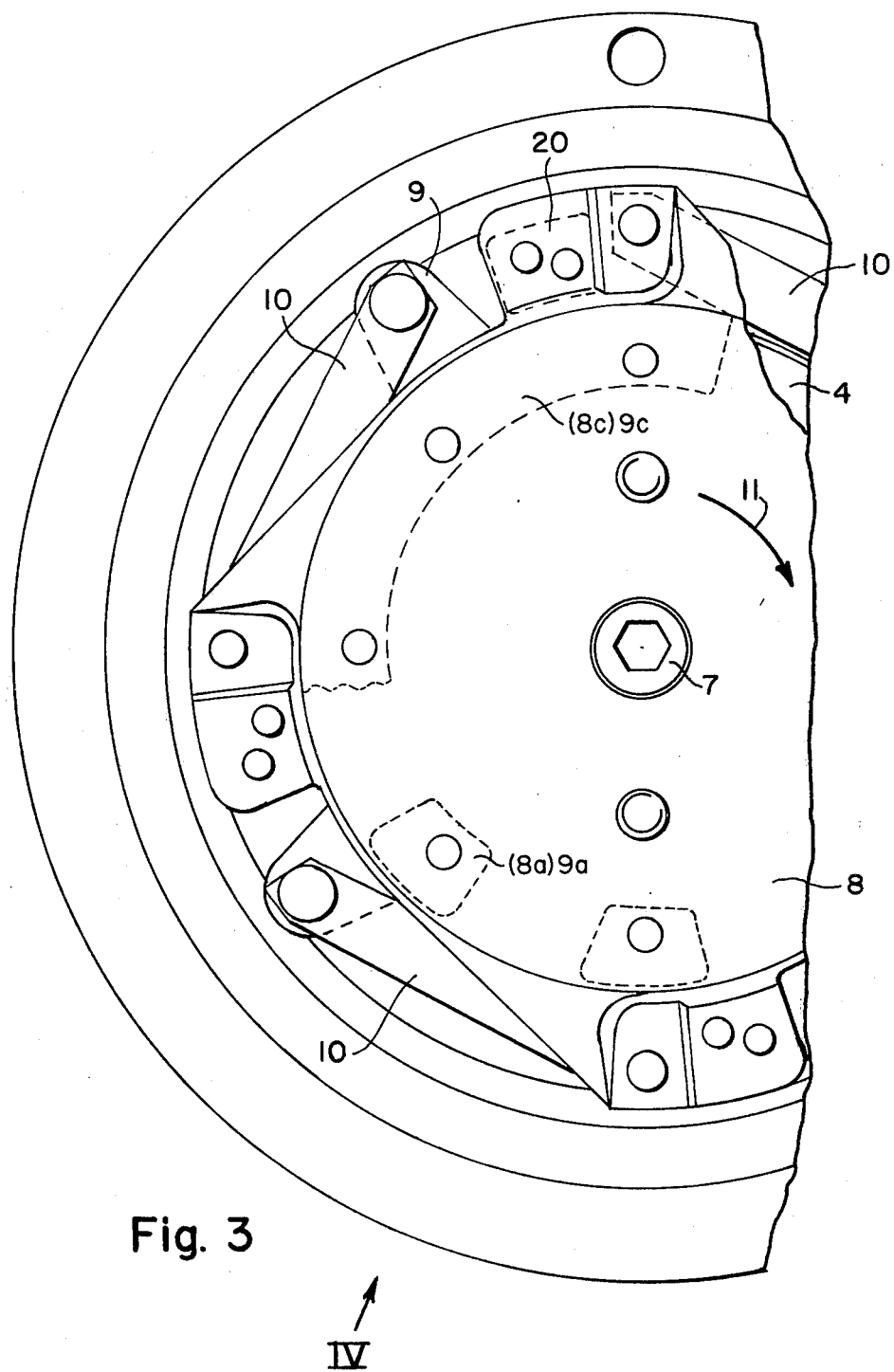
FIG. 3 is a side elevational view of FIG. 1 taken along the direction of the arrow III thereof.

This other friction part 8 has brake linings 20 shown in FIGS. 1, 3 and 4. The linings 20 are in the form of riveted-on pads on an extension which are disposed opposite braking surfaces 18b of the cup-shaped guide part 18.

In the position shown in FIGS. 1 and 2, the clutch is engaged, the driving part 1 and friction disc 4 are frictionally connected to the driven parts 8 and 9 of the device, the lawn mower blade 2 which can be fastened by screws 21 is driven, and the brake linings 20 are spaced from the braking surfaces 18b. This engaged condition of the clutch is brought about by bringing an element such as a handle, for instance, into the operational position. The element or handle exerts a pulling force in the direction of the arrow 15a on the flexible cable, as illustrated in FIG. 2. In this way, the sleeve 13 has been rotated in the direction of the arrow 13d through the lever extension 14. Furthermore, through the use of a coarse-pitch thread, ball and guide 13b, 13c and 18a, respectively, the sleeve 13 has been shifted in the axial direction, i.e. in the direction of the arrow 4c of FIG. 1. In this way, the counter-friction surfaces 4a and 4b of the friction disc 4 are brought into engagement with the friction linings 8c, 9c, or pads 8a and 9a of the friction parts 8 and 9 and the torque is transmitted by the friction disc 4 to the friction parts 8 and 9 and to the blade 2. Accordingly, in the engaged position shown in FIG. 1, the sleeve 13 has already been moved in the direction of the arrow 4c, because the recesses 18a cause the balls 13c to move along the thread 13b and push the sleeve 13 axially, so that the rim 13a is spaced from or only lies lightly against the friction part 9. This allows the spring 10 to move friction parts 8a, 9b or linings 8c, 9c into contact with the friction surfaces 4a, 4b of the disc 4. This action is further amplified by the disposition and construction of the leaf springs 10, which cause a self-amplifying locking effect of the two friction parts 8,9 in the direction toward the friction disc 4.

When the respective element is released, i.e., if the operating position of an element such as a handle of the lawn mower is released, the spring 17 causes the sleeve 13 to rotate against the direction of the arrow 13d of FIG. 2 so that the coarse-pitch thread/ball guide moves the sleeve 13 against the arrow 4c. To reach the disengaged position, the rotation of the sleeve 13 causes the sleeve 13 to shift against the arrow 4c and the rim 13a lifts the friction part 9 off the disc 4. The friction linings 9a are lifted off the friction disc 4 and the clutch is thus released. Simultaneously, an axial motion of the friction part 8 is effected by the leaf spring 10, and the brake linings 20 become engaged with the braking surface 18b. Besides opening the clutch, this also exerts a braking action, so that a reliable and safe stopping of the blade 2 is assured. In this connection, it is advantageous if the axial stroke of the sleeve 13 which being lifted, is always larger than the spacing between the brake lining 20 and the braking surface 18b (which appears in the engaged condition of the clutch) and the possible wear distance between these parts. This ensures that even with abrasion at the braking surfaces, a drag torque that may exist between the friction disc 4 and the friction lining 8a of the other friction part 8, is always smaller than the braking effect.

In accordance with another embodiment of the invention, the friction disc 4 is specifically weighted so that it acts as a flywheel for the engine. This allows the engine to start easily and run smoothly even when the blade 2 is disengaged. This is particularly important if the only flywheel effect is provided by the blade 2.

There are claimed:

1. Device for connecting a driving element to a driven element so as to be locked against mutual rotation, and for separating the same, comprising a friction disc being axially shiftable on the driving element and having two friction surfaces, said disc being fixed against radial movement and shiftable in axial direction, means for stopping the axial shift of said disc in direction away from the driving element, the driven element being in the form of axially shiftable friction parts being coaxial and engageable with said friction disc and rotatable relative thereto, each of said friction parts having a counterfriction surface disposed thereon, connecting means for transmitting torque between said friction parts, said connecting means being yieldable in axial direction and stiff in direction of rotation of said friction parts, and means for disengaging one of said friction parts from said friction disc.

2. Device according to claim 1, wherein said connecting means is a leaf spring.

3. Device according to claim 1, wherein said counterfriction surfaces on said friction parts are in the form of friction linings being disposed on sides of said friction parts, said friction linings facing said friction surfaces of said friction disc.

4. Device according to claim 3, wherein said friction linings are individual segment-shaped pad sections.

5. Device according to claim 1, wherein said connecting means includes means for producing a force component toward the driving element between said friction parts when the driven element is connected to the driving element.

6. Device according to claim 1, including a non-rotatable part and a braking device effective between one of said friction parts and said non-rotatable part.

7. Device according to claim 6, including a brake lining disposed on at least one of said friction part and said non-rotatable part.

8. Device according to claim 1, including a non-rotatable part, and wherein said connecting means includes means for transmitting axial motion to the other of said friction parts if the connection is released and contact pressure between said other friction part and said non-rotatable part is produced.

9. Device according to claim 7, wherein in the engaged position of said one friction part and friction disc, said brake lining disposed on one of said one friction part and non-rotatable part is spaced at a given distance from a braking surface on the other of said one friction part and non-rotatable part, said given distance being less than the axial disengagement travel of the other of said friction parts and the possible wear distance between said lining and said braking surface.

10. Device according to claim 1, wherein said disengaging means includes an axially movable sleeve extending from one side of one of said friction parts being engageable therewith from the other side of said one friction part.

11. Device according to claim 10, including a motor connected to the driving part, a non-rotatable part firmly connected to the motor and disposed adjacent said sleeve, said sleeve having a screw thread integral therewith for effecting rotation between said sleeve and non-rotatable part, and a flexible cable having a core connected to said sleeve for rotating said sleeve to disengage said one friction part from said friction disc.

12. Device according to claim 10, including releasable operating means for moving said sleeve in axial direction to disengage said one friction part from said friction disc upon release of said operating means.

13. Device according to claim 11, wherein said screw thread is a coarse screw thread, and including ball guide means disposed in said coarse screw thread.

14. Device according to claim 1 or 13, including a lawn mower blade attached to one of said friction parts.

15. Device according to claim 14, wherein said operating means is an operating handle of a lawn mower, said friction disc is a flywheel for the motor, and the motor is an internal combustion engine of a lawn mower.

* * * * *